(12) United States Patent
Stieglitz et al.

(10) Patent No.: US 7,673,025 B2
(45) Date of Patent: Mar. 2, 2010

(54) CONTROLLING ACCESS MESSAGE FLOW

(75) Inventors: Jeremy Stieglitz, Menlo Park, CA (US); John Zamick, Shipman (GB)

(73) Assignee: Cisco Technology, Inc., San Jose, CA (US)

( * ) Notice: Subject to any disclaimer, the term of this patent is extended or adjusted under 35 U.S.C. 154(b) by 1337 days.

(21) Appl. No.: 10/837,485

(22) Filed: Apr. 29, 2004

(65) Prior Publication Data

US 2005/0243717 A1 Nov. 3, 2005

(51) Int. Cl.
G06F 15/173 (2006.01)
(52) U.S. Cl. .................................. 709/223; 709/224
(58) Field of Classification Search ................ 709/203, 709/207, 223, 224
See application file for complete search history.

(56) References Cited

U.S. PATENT DOCUMENTS

| | | | |
|---|---|---|---|
| 4,218,738 A | 8/1980 | Matyas et al. | |
| 5,369,707 A | 11/1994 | Follendore, III | |
| 5,682,475 A | 10/1997 | Johnson et al. | |
| 5,815,657 A | 9/1998 | Williams et al. | |
| 5,964,877 A | 10/1999 | Victor et al. | |
| 5,991,807 A | 11/1999 | Schmidt et al. | |
| 6,070,243 A | 5/2000 | See et al. | |
| 6,070,244 A | 5/2000 | Orchier et al. | |
| 6,202,157 B1 | 3/2001 | Brownlie et al. | |
| 6,219,706 B1 | 4/2001 | Fan et al. | |
| 6,292,798 B1 | 9/2001 | Dockter et al. | |
| 6,308,205 B1 * | 10/2001 | Carcerano et al. | ............ 709/221 |
| 6,317,829 B1 | 11/2001 | Van Oorschot | |
| 6,370,250 B1 | 4/2002 | Stein | |
| 6,574,664 B1 * | 6/2003 | Liu et al. | ..................... 709/224 |
| 6,601,093 B1 * | 7/2003 | Peters | ......................... 709/220 |
| 6,609,154 B1 | 8/2003 | Fuh et al. | |
| 6,643,693 B1 * | 11/2003 | Reynolds et al. | ............. 709/223 |
| 6,643,784 B1 | 11/2003 | McCulligh | |
| 6,665,714 B1 * | 12/2003 | Blumenau et al. | ........... 709/222 |
| 6,728,884 B1 | 4/2004 | Lim | |
| 6,735,310 B1 | 5/2004 | Hsing et al. | |
| 6,760,768 B2 | 7/2004 | Holden et al. | |
| 6,772,332 B1 | 8/2004 | Boebert et al. | |
| 6,772,334 B1 | 8/2004 | Glawitsch | |
| 6,772,336 B1 | 8/2004 | Dixon, Jr. | |
| 6,892,264 B2 * | 5/2005 | Lamb | ......................... 710/301 |
| 7,249,173 B2 * | 7/2007 | Nicolson | ..................... 709/223 |
| 2005/0198190 A1 * | 9/2005 | Zavalkovsky et al. | ........ 709/217 |

(Continued)

OTHER PUBLICATIONS

Cisco Systems, Inc., "Easy Secure Device Deployment AAA Integration," 2004, pp. 1-22.

(Continued)

*Primary Examiner*—Hussein Elchanti
(74) *Attorney, Agent, or Firm*—Hickman Palermo Truong & Becker LLP

(57) ABSTRACT

Techniques are provided for controlling access message flow. The techniques include receiving one or more access messages; determining one or more sets of features, one for each access message; receiving a particular access message; determining a particular set of one or more features for the particular access message; determining whether the particular access message satisfies a particular condition based on the particular set of one or more features and the one or more sets of features; and if the particular access message satisfies the particular condition, performing a responsive action based on the particular condition.

63 Claims, 4 Drawing Sheets

U.S. PATENT DOCUMENTS

2006/0120289 A1    6/2006    Cunningham
2007/0106808 A1    5/2007    Vemula et al.

OTHER PUBLICATIONS

Cisco Systems, Inc., "Configuring Authentication Proxy," Cisco IOS Security Configuration Guide, pp. SC-289-SC-320.

Cisco Systems, Inc., "Configuring Authentication and Authorization," Cisco ACNS Software Caching Configuration Guide, pp. 13-1-13-28.

International Searching Authority, "Notification of Transmittal of the International Search Report and the Written Opinion of the International Searching Authority, or the Declaration", International application No. PCT/US05/14976, dated Jul. 18, 2007, 8 pages.

Claims, International application No. PCT/US05/14976, 15 pages.

* cited by examiner

CONTROLLING ACCESS MESSAGE FLOW

FIELD OF THE INVENTION

The present invention generally relates to providing access control in a network environment. The invention relates more specifically to controlling access message flow.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Access control is a crucial component to networked systems. An approach to providing access control for services on a network is to provide access control servers, which authenticate and authorize supplicants, and network devices, which broker communication between supplicants and the access control servers as well as between supplicants and the other servers or services in the network. One type of access control server is provided using an Authentication, Authorization, and Accounting (AAA) server. An AAA server may implement any number of protocols including Remote Authentication Dial In User Service (RADIUS), Diameter, Terminal Access Controller Access Control System (TACACS+), Extensible Authentication Protocol (EAP), Protected Extensible Authentication Protocol (PEAP), Extensible Authentication Protocol/Transport Level Security Protocol (EAP-TLS), Lightweight Extensible Authentication Protocol (LEAP), and Extensible Authentication Protocol-Subscriber Identity Module Protocol (EAP-SIM).

For each of these protocols, one or more "access messages" must be sent between the supplicant and the access control server in order to authenticate and authorize the supplicant. If a supplicant sends a message that is incorrectly formatted ("poorly formed"), the access control server may simply reject the message, possibly sending a response to inform the supplicant that the message is poorly formed. If the supplicant sends a well-formed message, that is, a message that conforms to the format of the appropriate protocol(s), then the access control server acts on the content of the message.

In some cases, however, and particularly when a supplicant is misconfigured, the supplicant may send a well-formed message, the content of which is inappropriate. Processing these inappropriate messages can cause undue load on the access control server, especially if the message is repeatedly sent from the supplicant to the access control server. This can result in legitimate, but improperly configured, devices generating substantial erroneous traffic that can downgrade or suspend the ability of the access control server to service appropriate requests.

These considerations are particularly important with the introduction of EAP over RADIUS as EAP provides an EAP communication "channel", from the server to the supplicants, "bridged" over the RADIUS client. In such an instance, the EAP/RADIUS supplicants (end clients attempting access such as laptops (EAP-TLS), cellular phones (EAP-SIM), or personal data assistants (LEAP)) have a direct logical communication channel to the access control server for the authentication process. The use of the EAP protocols increases the risks for both deliberate denial-of-service ("DOS") attacks by rogue EAP supplicants as well as unintended server request flooding by legitimate users with misconfigured supplicant software.

Consider, for example, a Wireless Local Area Network (WLAN) scenario in which a misconfigured supplicant attempts to make several network connections to several adjacent WLAN access points within the same second. Each of these connections will generate a new access message to the access control server, causing unnecessary load on the access control server. Even a relatively small number of such misconfigured supplicants can degrade AAA server performance and a larger number can generate enough traffic to significantly impair the performance of the AAA server. The degradation of server performance caused by such misconfigured devices or malicious attacks reduces the load of legitimate access control messages that a particular access control server is able to service, and thereby reduces the scalability and increases the cost of the system as a whole.

Based on the foregoing, there is clearly a need for an approach to reduce the impact of erroneous messages from misconfigured supplicants and purposefully malicious entities.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
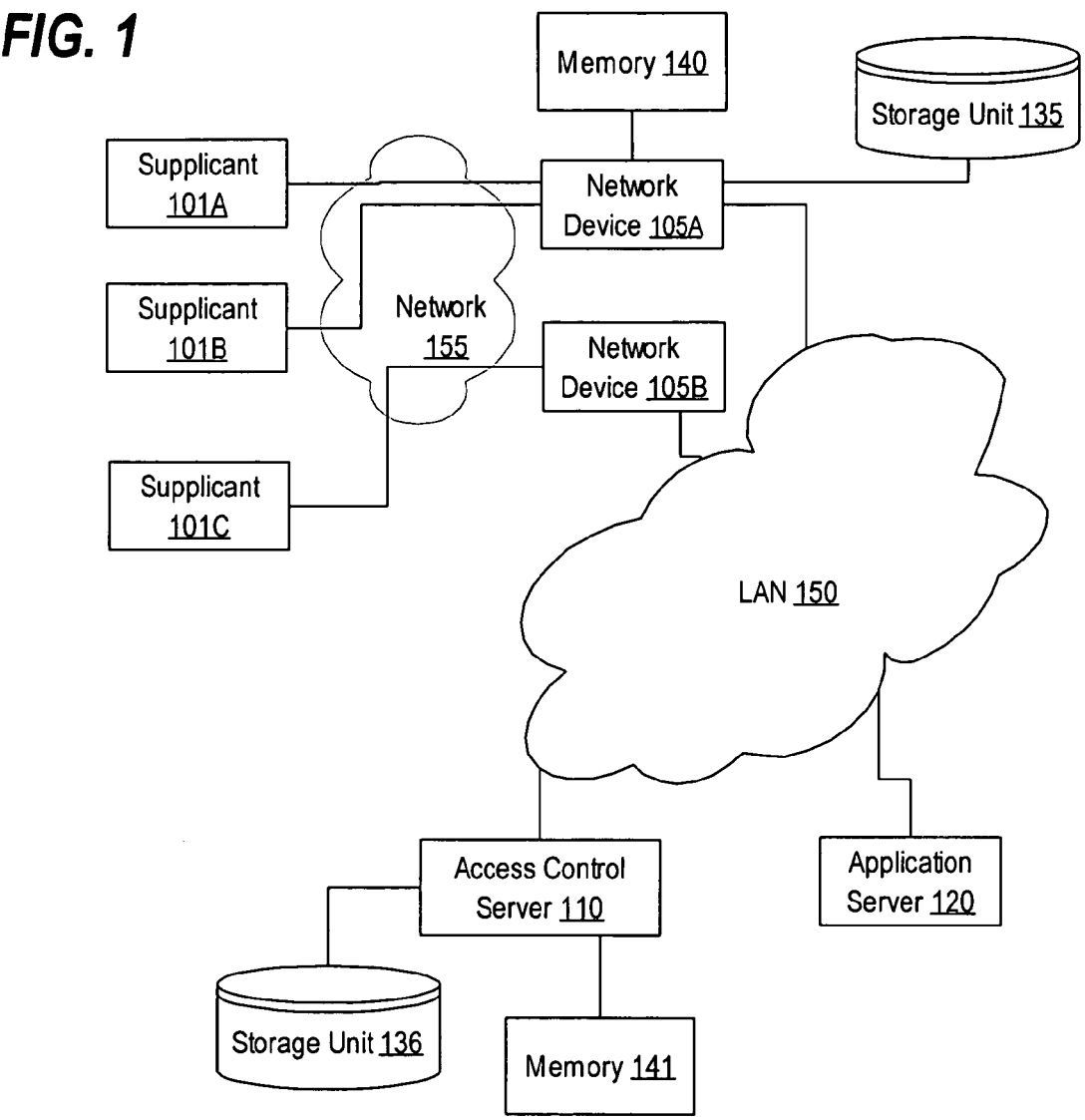
FIG. 1 is a block diagram that depicts an example system for controlling access message flow.

Techniques for controlling access message flow are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural Overview |
| 3.0 | Functional Overview |
| | 3.1 Conditions |
| | 3.2 Responsive Actions |
| | 3.3 Example Process Flows |
| 4.0 | Hardware Overview |
| 5.0 | Extensions and Alternatives |

1.0 General Overview

The needs identified in the foregoing Background, and other needs and objects that will become apparent for the following description, are achieved in the present invention, which includes, in one aspect, techniques for controlling access message flow including receiving one or more access messages; determining one or more sets of features, where the one or more sets of features include a set of one or more features for each of one or more of the one or more access messages; receiving a particular access message; determining a particular set of one or more features of the particular access message; determining whether the particular access message satisfies a particular condition based on the particular set of one or more features and the one or more sets of features; and if the particular access message satisfies the particular condition, performing a responsive action based on the particular condition.

In a related feature, performing the responsive action includes blocking the particular access message. In a related feature, performing the responsive action includes blocking all messages of one or more particular types from a sender of the particular access message for a predetermined amount of time. In a related feature, performing the responsive action includes sending an alert to a sender of the particular access message. In a related feature, performing the responsive action includes sending an alert to a system administrator indicating that the particular condition has been satisfied. In a related feature, performing the responsive action includes writing a record to a machine-readable medium indicating that the particular condition has been satisfied. In a related feature, performing the responsive action includes sending a message to a sender of the particular access message indicating that the sender of the particular access message cannot send subsequent access messages of one or more types for a predefined amount of time. In a related feature, performing the responsive action includes sending a message to a sender of the particular access message indicating that the sender of the particular access message cannot forward messages from a particular originator of the particular access message for a predefined amount of time. In a related feature, the particular condition is one of one or more conditions and the techniques further include selecting the particular condition from the one or more conditions based on any of a sender of the particular access message, a device to which the particular access message was sent, one or more features of the particular set of one or more features, or a duration of time which the sender of the particular access message has been connected to the device to which the particular access message was sent.

In a related feature, determining one or more sets of features includes determining whether a sender of a certain access message of the one or more access messages is trusted; if the sender of the certain access message is not trusted, determining a set of features for the certain access message; and if the sender of the certain access message is trusted, not determining the set of features for the certain access message. In a related feature, the techniques further include determining whether the particular access message satisfies a second particular condition based on the particular set of one or more features and the one or more sets of features; and if the particular access message satisfies the second particular condition, performing a second responsive action based on the second particular condition.

In a related feature, a particular feature of the particular set of one or more features of the particular access message corresponds to a particular feature instantiation of the particular feature; where a second particular feature of a second particular access message of the one or more access messages is the same feature as the particular feature and the second particular feature corresponds to the particular feature instantiation of the particular feature; and where determining whether the particular access message satisfies the particular condition includes determining if the difference in time between when the particular access message and the second particular access message arrived is less than a predefined threshold. In a related feature, the particular feature is one of IP address, MAC address, RADIUS Username, Diameter Username, TACACS+ Username, or EAP Identity.

In a related feature, where a first particular feature and a second particular feature are each one of the particular set of one or more features of the particular access message; where a third particular feature and a fourth particular feature are each one of the sets of one or more features of a certain access message of the one or more access messages; where the first particular feature and third particular feature both correspond to a first certain feature; where the second particular feature and fourth particular feature both correspond to a second certain feature; and where determining whether the particular access message satisfies the particular condition includes determining whether the first particular feature corresponds to a first particular feature instantiation of the first certain feature and the third particular feature corresponds to the same first particular feature instantiation of the first certain feature; and determining whether the second particular feature corresponds to a second particular feature instantiation of the second certain feature and the fourth particular feature corresponds to a third particular feature instantiation of the second certain feature, where the second particular feature instantiation and the third particular feature instantiation are distinct from one another. In a related feature, the first certain feature or the second certain feature are each one of IP address, MAC address, RADIUS Username, Diameter Username, TACACS+ Username, or EAP Identity. In a related feature, each set of one or more features or the particular set of one or more features includes one or more of IP address, MAC address, RADIUS Username, Diameter Username, TACACS+ Username, or EAP Identity. In a related feature, the techniques further include receiving configuration information indicating the particular condition; and receiving configuration information indicating the responsive action for the particular condition.

In another aspect, techniques are provided for controlling access message flow including determining a particular condition and a particular responsive action based on two or more messages; configuring a device to detect the particular condition; configuring the device to perform the particular responsive action upon detection of the particular condition; receiving one or more access messages; determining one or more sets of features, where the one or more sets of features include a set of one or more features for each of one or more of the one or more access messages; receiving a particular access message; determining a particular set of one or more features of the particular access message; determining whether the particular access message satisfies the particular condition based on the particular set of one or more features and the one or more sets of features; and if the particular access message satisfies the particular condition, performing the particular responsive action.

In another aspect, a system is provided for controlling access message flow including a supplicant that includes a first network interface configured to communicate with an access control server; the access control server including a second network interface configured to communicate with the supplicant, the access control server further including a processor; one or more stored sequences of instructions which, when executed by the processor, cause the processor to carry out the steps of receiving one or more access messages; determining one or more sets of features, where the one or more sets of features include a set of one or more features for each of one or more of the one or more access messages; receiving a particular access message; determining a particular set of one or more features of the particular access message; determining whether the particular access message satisfies a particular condition based on the particular set of one or more features and the one or more sets of features; and if the particular access message satisfies the particular condition, performing a responsive action based on the particular condition.

In another aspect, a system is provided for controlling access message flow including a supplicant that includes a first network interface configured to communicate with an access control server via a network device; the access control server configured to communicate with the network device and with the supplicant via the network device, the access control server including a second network interface; the network device including a processing means and a third network interface configured to communicate with the supplicant and the access control server, the network device further including: a processor; one or more stored sequences of instructions which, when executed by the processor, cause the processor to carry out the steps of receiving one or more access messages; determining one or more sets of features, where the one or more sets of features include a set of one or more features for each of one or more of the one or more access messages; receiving a particular access message; determining a particular set of one or more features of the particular access message; determining whether the particular access message satisfies a particular condition based on the particular set of one or more features and the one or more sets of features; and if the particular access message satisfies the particular condition, performing a responsive action based on the particular condition.

In other aspects, the techniques encompass a computer apparatus and a machine-readable medium configured for controlling access message flow.

2.0 Structural Overview

FIG. 1 is a block diagram that depicts an example system for controlling access message flow.

One or more supplicants 101A, 101B, 101C are communicatively coupled to network devices 105A, 105B. In one embodiment, communication of supplicants 101A, 101B, 101C with network devices 105A, 105B is over a network 155. In various embodiments, the network 155 is a wireless network, dial up access, the Internet, a local area network (LAN), wireless local area network (WLAN), wide area network (WAN), or any other communication network. In various embodiments, the network device 105 is a wireless access point, a virtual private network device, a network access control server, a switch, a router, or any other appropriate device.

An application server 120 and network devices 105A and 105B are communicatively coupled to the LAN 150. In various embodiments, the LAN 150 is a wireless network, dial up access, the Internet, or any other appropriate communications network.

An access control server 110 is communicatively coupled to network devices 105A and 105B, to storage unit 136, and to a memory 141. In one embodiment, communication of the access control server 110 to the network devices 105A and 105B is performed over the LAN 150; and the access control server 110 and the network devices 105A and 105B are each communicatively coupled to LAN 150. The network device 105A is also communicatively coupled to a storage unit 135 and to a memory 140. In various embodiments, storage units 135 and 136 include one or more of: a database, a flat file, a data structure in memory, or any other appropriate storage. For example, a storage unit 135 or 136 may include both a database and a flat file. Herein a database that is part of a storage unit 135 or 136 may be referred to as a database 135 or database 136, respectively. In various embodiments, memories 140 and 141 include one or more of a random access memory, read only memory, or a machine-readable medium as described in the section entitled Hardware Overview. Each memory 140 and 141 may be part of the same logical machine or physical machine as the network device 105A or access control server 110 with which it is associated. Alternatively, memories 140 and 141 may be part of separate physical machines from and may be communicatively coupled to network device 105A and access control server 110, respectively.

In various embodiments, the access control server 110 is an authentication, authorization, and accounting (AAA) servers, RADIUS server, Diameter Server, EAP Server, TACACS+ server, or any other appropriate access control server. In various embodiments, coupling is accomplished by optical, infrared, or radio signal transmission, direct cabling, wireless networking, LANs, WANs, WLANs, the Internet, or any appropriate communication mechanism.

The supplicants 101A, 101B, and 101C; the network devices 105A and 105B; and the access control server 110 are each logical machines. Each logical machine may run on separate physical computing machines or may be running on the same physical computing machine as one or more of the other logical machines. Various embodiments of computers and other physical and logical machines are described in detail below in the section entitled Hardware Overview.

Consider this example of a functioning system of FIG. 1. Network device 105A acts as an access regulator for a supplicant 101A, controlling access for the supplicant 101A. The network device 105A may account for all of the activity that passes through it via a storage unit 135. When supplicant 101A first tries to access a resource such as an application server 120, the network device 105A communicates with the access control server 110 to authenticate and authorize the supplicant 101A through the LAN 150. The authorization, authentication, and all other activity at the access control server 110 are accounted for in a storage unit 136. The authorization, for example, may be performed via indirect communication between a supplicant 101A and the access control server 110 using the EAP protocol. In such an example, the communication of the EAP packets may be performed by using the RADIUS protocol to facilitate communication between the supplicant 101A and the device 105A as well as between the device 105A and the access control server 11A. There are many other protocols that may be used in the examples given herein including, nonexclusively: EAP, LEAP, EAP-SIM, Diameter, TACACS+.

3.0 Functional Overview

As discussed in more detail below, in the techniques described herein features of arriving access messages are determined; one or more conditions related to features of the access messages may be detected, and based on those conditions, one or more responsive actions may be performed. In the context of FIG. 1, detecting the condition may be performed by a network device 105A, 105B, an access control server 110, or any process communicatively coupled to either the network device 105A, 105B or the access control server 110. Regardless of where the condition detection takes place, the responsive action may be performed by the network device 105A, 105B or at the access control server 110 or any process communicatively coupled to either the network device 105A, 105B or the access control server 110.

3.1 Conditions

The condition or conditions to be detected may represent particular behavior that occurs when a supplicant is misconfigured or may represent behavior that occurs when a denial of service attack or other malicious attack is performed. For example, in the context of FIG. 1, a misconfigured wireless supplicant 101A (such as a laptop) may attempt to make several network connections to several adjacent WLAN access points 105A and 105B within the same second. Each of these connections will generate a new request, causing unnecessary load on the access control server 110. Since the formats of these messages are valid, each one must be processed in order to determine its content. As a result, even a relatively small number of such misconfigured supplicants 101A, 101B, and 101C may degrade an access control server's 110 performance; and a larger number of misconfigured supplicants 101A, 101B, and 101C may generate enough traffic to significantly impair the performance of an access control server 110.

Thus, an example condition that could be detected is the receipt of two access messages of the same type from the same sender within a predefined amount of time. For example, in the context of FIG. 1, receiving two RADIUS Access-Challenge messages from the same supplicant within two seconds may indicate that the supplicant 101A is misconfigured; and, therefore, the receipt of two RADIUS Access-Challenge messages from supplicant 101A within two seconds may be a condition that warrants responsive action.

Other example conditions that may warrant responsive action are the arrival of two or more access messages from a single sender with different values for a particular feature or the receipt of two or more access messages from two or more senders, where the two or more messages have the same value for a particular feature. For example, in the context of FIG. 1, a condition that one may want to detect may be receiving two or more messages using the same identifier, such as RADIUS Username, from two different IP addresses. The use of a single identifier from multiple devices (as represented by the multiple IP addresses) may indicate one or more misconfigured supplicants 101A, 101B, and 101C, or may indicate that a malicious entity is attempting a denial of service attack. Other example identifiers which may be used in detecting such a condition may include Diameter Username, TACACS+ Username, EAP identity, or any other appropriate identifier related to the supplicant including those defined in the protocols.

One example of a condition based on receiving multiple RADIUS requests from the same device (as identified by IP address) may be expressed in the form of a rule, such as:

If (Access-Challenge Requestor IP=x.x.x.x)
and (Identifier=x)
and (frequency=<3 seconds)
then perform responsive action Conditions may be determined in any appropriate manner, including their definition by a system developer or system administrator based on knowledge of how the system works as a whole, experience with malicious attacks, expected system behavior, or experience with misconfigured clients and supplicants.

3.2 Responsive Actions

Once a condition is detected, one or more responsive actions may be taken. The responsive action may be programmed or otherwise indicated by the administrator of the system and may range across a spectrum of "intrusiveness" to the supplicant ranging from no effect on the supplicant to significant effect. An example of a less intrusive action may be generating an alert and sending it to the system administrator. An example of a more intrusive action may be to invoke protection for the server from the misbehaving supplicant by blocking messages from the supplicant. The actions to be taken based on particular conditions may be defined in any appropriate manner. For example, if a system is known to have a problem with misconfigured wireless supplicants, then a system administrator may want to set up a condition for detection of misconfigured supplicants and to configure the system to respond to that condition by sending a message to the supplicant with instructions on how to correctly configure the supplicant.

Various embodiments may perform responsive actions such as blocking a message from a supplicant, blocking all messages from a supplicant for a predetermined period of time, blocking all messages from a supplicant until notified to resume processing messages from the supplicant, sending an alert to a sender of the particular access message, sending an alert to a system administrator indicating that the particular condition has been satisfied, writing a record to a machine-readable medium indicating that the particular access message satisfies the particular condition, writing a record to a machine-readable medium indicating that the particular condition has been satisfied, or performing a remedial action. Identification of a supplicant for blocking may be based, for example, on device port, supplicant Media Access Control (MAC) address, IP address, or any other supplicant identifier. In various embodiments, the device port may be a physical port, a virtual port on a virtual private network, a TCP port of a Transmission Control Protocol/Internet Protocol (TCP/IP) network device, a Universal Datagram Protocol (UDP) port, a virtual port on a wireless access point, or any other appropriate port. For example, in the context of FIG. 1, assume that two RADIUS Access-Challenge messages are received from a supplicant 101A within two seconds, and this satisfies a particular condition; as a responsive action, subsequent RADIUS Access Challenge messages from the supplicant 101A, as determined by supplicant MAC address, are blocked for the next sixty seconds.

Performing a responsive action may also include generating or updating an access control list (ACL) used by an access control device to determine with which devices it interacts. The "flagged" devices identified in the ACL may be temporarily suspended and marked as untrustworthy. Messages from these devices may not be processed. Individual device entries in the ACLs may be associated with a time-to-live (TTL) value or other timeout mechanism to bring the devices back into compliance or trustworthiness after a predetermined amount of time. Optionally, such an access control lists could have manual overrides (e.g. allow device X back in) or specific device trust assertions (e.g. always trust device Y).

Other examples of responsive actions include sending a message to an offending supplicant indicating the condition satisfied by the access messages sent by the supplicant and sending an alert to a system administrator indicating any combination of: the condition satisfied, the supplicant identity, and information related to the access message.

Various embodiments may also, upon detection of a condition, write an entry to a database, log file, or other machine-readable medium indicating any combination of the condition satisfied, the supplicant identity, and information related to the access message. An aggregate of the stored information may enable a valuable system analysis.

As noted above, the responsive action may also include performing a remedial action. Performing the remedial actions may include sending a message to a network device or supplicant in order to stop offending messages "downstream". For example, in the context of FIG. 1, a RADIUS server 110 is communicating with an EAP supplicant 101A via a network device 105A (a RADIUS client). The network device 105A is sending and receiving messages from the EAP supplicant 101A and the RADIUS server 110 using the RADIUS protocol. The RADIUS server 110 receives an EAP message from a supplicant 101A and determines that the EAP message satisfies a particular condition (see step 250 below). The RADIUS server then sends a RADIUS Access-Reject message to the network device 105A indicating that the network device 105A should, for a predefined amount of time, block all messages from the EAP supplicant 101A or block the port that the EAP supplicant 101A is abusing. The indication to block the EAP supplicant 101A may be encoded in a Vendor Specific Attribute (VSA) of a RADIUS message. Alternatively, the RADIUS server 110 may send an EAP message to the EAP supplicant 101A indicating to the EAP supplicant that it should discontinue sending all messages or particular types of messages to the server 110 for a predetermined amount of time.

3.3 Example Process Flows

Any appropriate device may perform each of the steps in the process described herein. Some or all of the steps may be performed by a network device, an access control server, or a process communicatively coupled thereto. The choice of example used herein for devices performing steps in no way limits the techniques described herein.

Figure 2A:
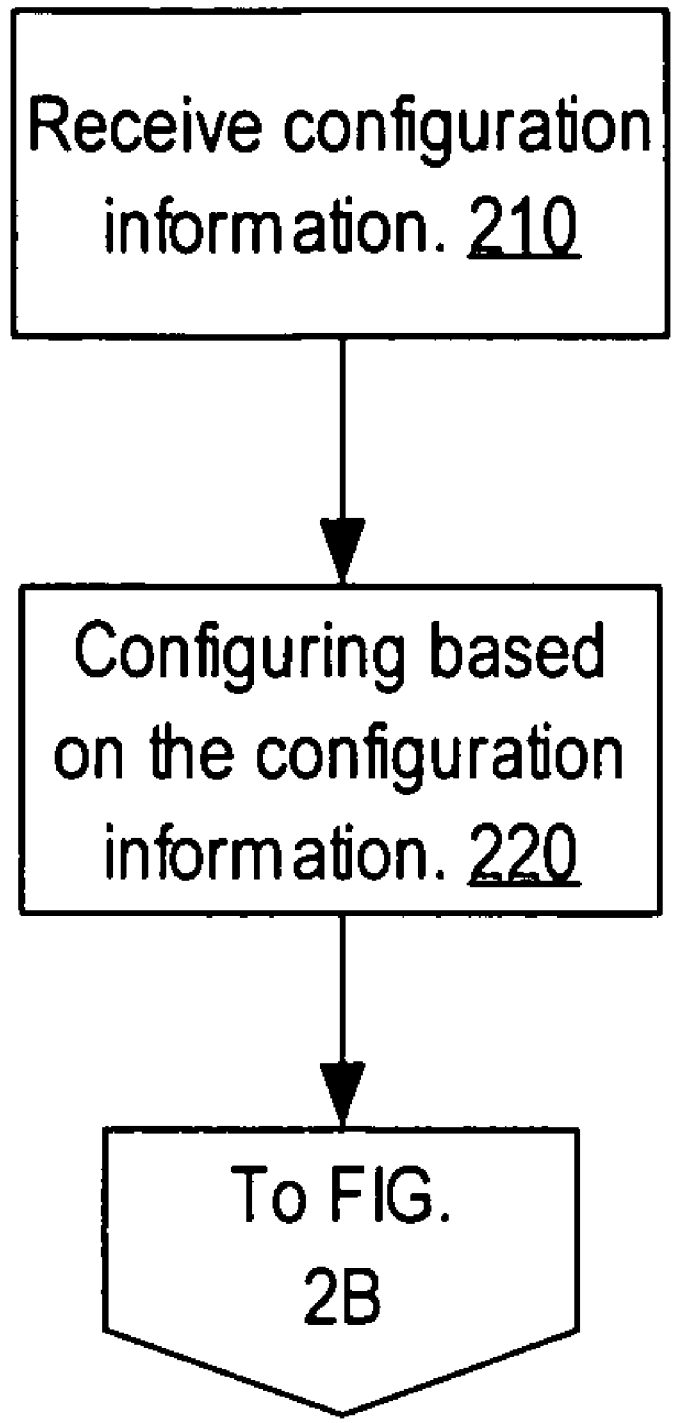
FIG. 2A is a flowchart that depicts a process for configuring a device for controlling access message flow.

FIG. 2A is a flowchart that depicts a process for configuring a device for controlling access message flow.

In step 210, configuration information is received. In various embodiments, the configuration information includes an indication of one or more conditions or an indication of a responsive action to be taken if a certain condition or certain conditions occur. Various embodiments of conditions and responsive actions are described in the sections entitled Conditions and Responsive Actions, respectively. The configuration information may take any appropriate form, such as an XML file, HTML file, spreadsheet, flat file, or any other appropriate format file. Configuration information may be expressed as a rule formatted using a symbolic language or markup language. The configuration information may be received via a graphical user interface configured to enable a human operator to indicate conditions and/or responsive actions. The configuration information may also be input via a command line interface. In one embodiment, the configuration information arrives in a format that is interpretable by the process or processes that are configured to detect whether the condition is satisfied or perform the responsive actions.

If configuration information related to one or more conditions is received in step 210, then in step 220, the process or processes detecting whether the condition is satisfied are configured based on the configuration information. In various embodiments, configuring the one or more processes to detect whether a condition is satisfied comprises storing the configuration information in a configuration file, providing logic to detect whether the condition is satisfied, or any other appropriate action. For example, in the context of FIG. 1, configuring an access control server 110 to detect that a particular condition is satisfied may comprise storing configuration information pertaining to the condition in a database 136 in symbolic form and, upon initialization or re-initialization of the access control server 110, reading the configuration information from the database 136 and generating logic to detect when the condition occurs based on configuration information.

If configuration information related to one or more responsive actions is received in step 210, then in step 220, the process or processes performing the responsive actions are configured based on the configuration information. In various embodiments, configuring the one or more processes that perform the responsive actions comprises storing the configuration information in a configuration file, providing logic to perform the responsive actions, or any other appropriate action. For example, in the context of FIG. 1, configuring an access control server 110 to perform a responsive action when a particular condition is satisfied may comprise storing configuration information pertaining to the action in a database 136 in symbolic form and, upon initialization or re-initialization of the access control server 110, reading the configuration information from the database 136 and generating logic which will perform the responsive action if the associated condition has occurred.

Figure 2B:
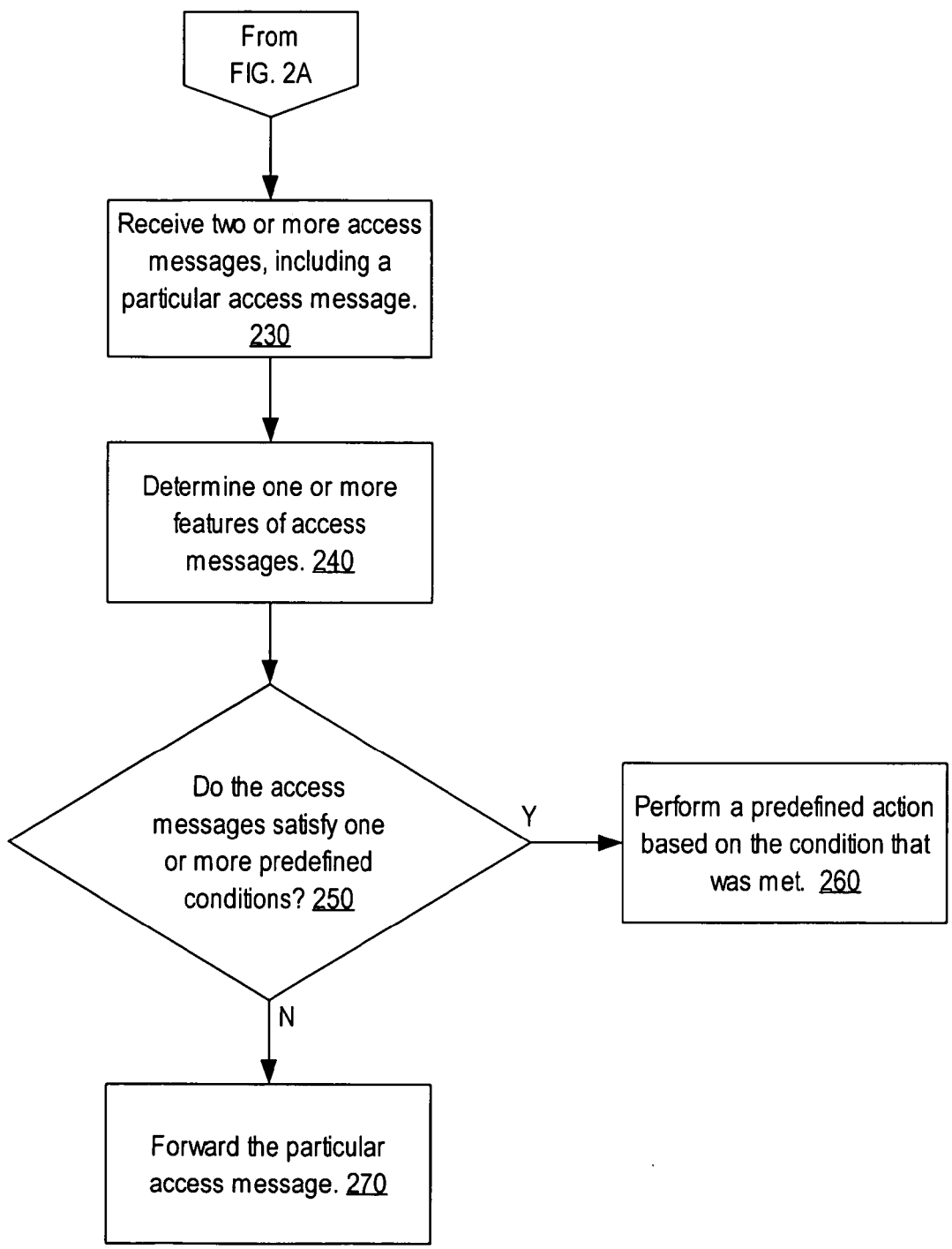
FIG. 2B is a flowchart that depicts a process for controlling access message flow.

In one embodiment, at some point after the process or processes have been configured as described with respect to step 220, the process in FIG. 2B is performed. Alternatively, an embodiment may be configured in a manner other than described in FIG. 2A before the process of FIG. 2B is performed. For example, in the context of FIG. 1, an access control server 110 or a network device 105A or 105B may be programmed to detect conditions and perform responsive actions based on those conditions, thereby enabling the process of FIG. 2B.

FIG. 2B is a flowchart that depicts a process for controlling access message flow.

In step 230, two or more access messages are received. In various embodiments, the messages are received from one or more supplicants or from one or more network devices. In one embodiment, messages may be received continually and the techniques described herein for condition detection and subsequent performance of responsive action are applied to each message as it arrives. The two or more messages include a particular message. In one embodiment, the particular message is the message that has arrived most recently. For example, in the context of FIG. 1, an access control server 110 receives two messages from a particular supplicant 101A via a network device 105A.

In step 240, one or more features are determined for one or more of the access messages received in step 230. In one embodiment, each time a message arrives, a set of features related to that message is determined and stored in a machine-readable medium. Alternatively, features may be determined for a subset of the messages that arrive in step 230. For example, in the context of FIG. 1, if supplicant 101B has been in communication with network device 105A for one hour, then supplicant 101B may be considered "trusted", and therefore messages from supplicant 101B to network device 105A are not processed in step 240. Supplicant 101A, however, may have just started communicating with network device 105A, and therefore is not yet considered trusted, and all messages from supplicant 101A may be processed in step 240. Alternatively, regardless of the trust level or amount of time that a supplicant 101A, 101B, 101C have been connected to a network device 105A, 105B or to an access control server 110, all messages from each supplicant 101A, 101B, 101C may be processed in step 240.

In various embodiments, the features determined in step 240 are stored in a storage unit, a database, or in a data structure in memory. For example, in the context of FIG. 1, the features determined in step 240 may be stored in storage unit 135, storage unit 136, memory 140, memory 141 or any accessible machine-readable medium.

In step 250, a check is performed to determine whether the access messages satisfy one or more predefined conditions. Example conditions are given above in the section entitled Conditions. In general, determining whether a particular condition is satisfied comprises determining whether the sets of one or more features of the access messages determined in step 240 satisfy any of the conditions by accessing the features and analyzing them with respect to the stored conditions. In one embodiment, the sets of features may be analyzed with respect to all conditions. Alternatively, the sets of one or more features may be analyzed with respect to particular conditions of the full set of conditions, and decision of determining which conditions to analyze, may be based on any combination of message sender, one or more features, device on which analysis is being performed or any other parameter. For example, in the context of FIG. 1, a network device 105A may check conditions for messages from supplicants 101A and 101B; network device 105B may check conditions for messages from supplicant 101C; and access control server 110 may check conditions for any supplicant 101A, 101B and 101C that has been connected for less than one minute. Further network devices 105A and 105B and access control server 110 may each check a different set of conditions.

Determining whether the access messages satisfy one or more predefined conditions may entail performing a search on a database, scanning a log file, accessing a data structure in memory, or any other appropriate method. For example, if the features determined in step 240 are stored in a database 136, performing a check to determine whether a certain condition is satisfied may comprise executing a query on the database 136.

If, in step 250, it is determined that the condition is satisfied, then in step 260 a responsive action is performed. Examples of responsive actions are described above in the section entitled Responsive Actions. The responsive action may include blocking the access message. In that case, the message may be discarded, written to a log file, stored in a database, or any other appropriate action may be taken. The responsive action may include sending a message to either the sender of the message, which may be a supplicant, or sending a message, alert, or report to a system administrator.

For any access message or condition, more than one responsive action may be performed. For example, in the context of FIG. 1, as part of step 260, a network device 105A may perform the responsive action of sending a message to supplicant 101A indicating which condition was satisfied in step 250. The network device 105A may then forward the message to the access control server 110.

If in step 250 it is determined that the condition is not satisfied, then in step 270 the message is forwarded. For example, in the context of FIG. 1, if the condition in step 250 is not satisfied, then in step 270, the network device 105A forwards the access message to the access control server 110.

In one embodiment, two or more conditions are checked as part of step 250. If the two or more conditions are satisfied, then two or more sets of responsive actions may be taken as part of step 260. If none of the two or more conditions are satisfied, then the message may be forwarded in step 270.

Various embodiments of the techniques described in FIG. 2A and FIG. 2B provide techniques for detecting conditions that may hinder or impair overall system performance and conditions that indicate malicious behavior. Once one of these conditions is detected, responsive action may be taken in order to improve the situation.

The techniques described herein may also provide improved reliability and resiliency of the access control system, better troubleshooting, reporting, and auditing; and more scalable and better performing systems. Reliability and resiliency of the access control system may be improved by taking a defensive stance against potential degradations in access control. With the defensive measures described herein, malicious or misconfigured devices may have less impact on the performance of the access control server. The techniques described herein may provide alerts and reports of anomalous behavior as it is happening. This reporting may facilitate an acceleration of troubleshooting and diagnostics for the system as a whole. Given that reports may be sent to a system administrator or any other individual or group of individuals as soon as they are detected, the techniques described herein may also facilitate the quick detection of attacks on a system.

By quickly filtering erroneous requests and thereby decreasing the overall workload on an access controller, each access controller may be able to sustain a higher load, thereby increasing the overall scalability and performance of the access control system and reducing the cost of the system as a whole.

4.0 Hardware Overview

Figure 3:
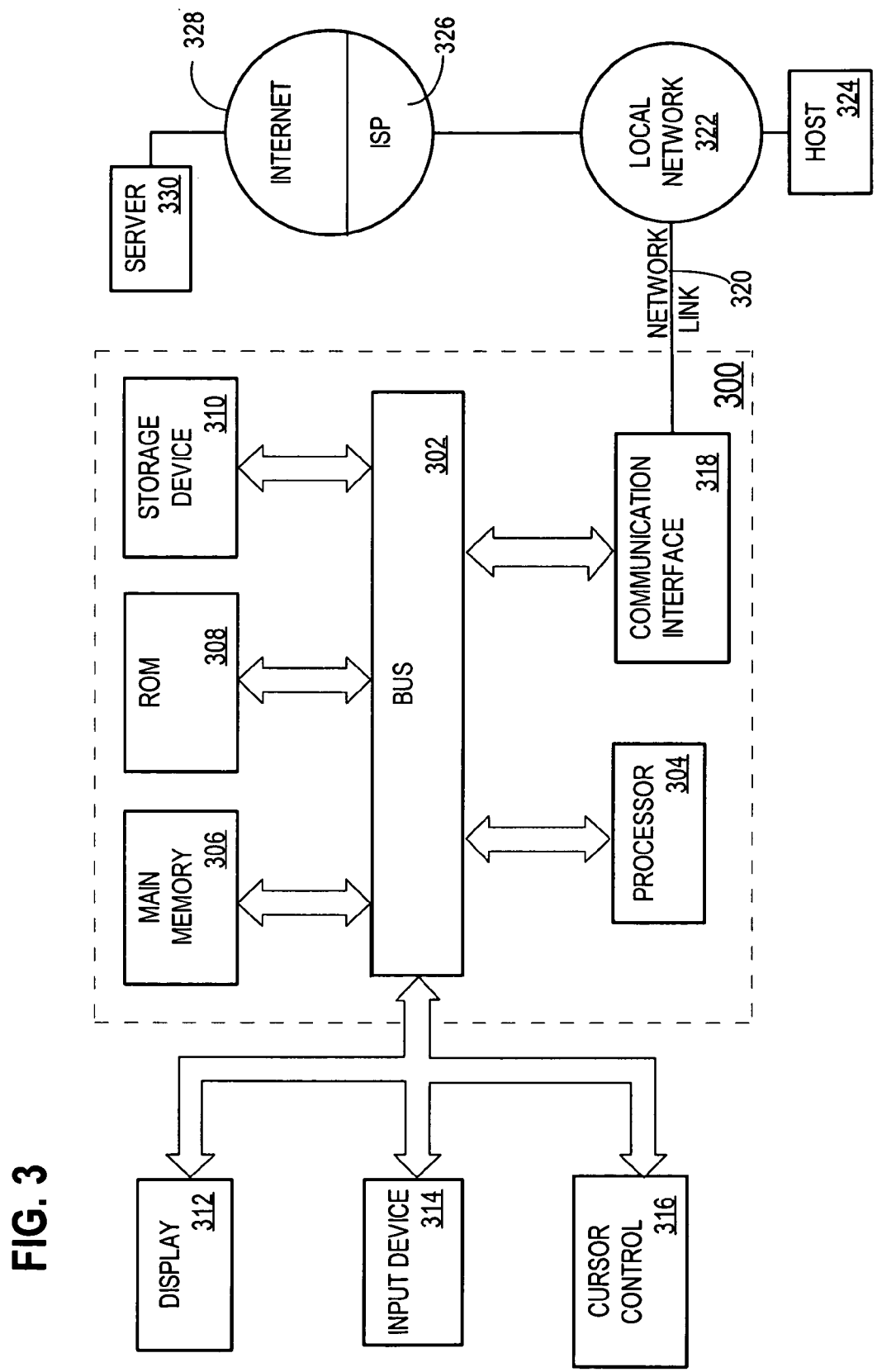
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of controlling access message flow comprising:
  upon receiving a particular access message at an access control server, determining a particular set of one or more features of the particular access message;
  determining whether the particular access message satisfies a particular condition based on the particular set of one or more features, wherein satisfying the particular condition indicates that the particular access message (a) has a valid format, and (b) comprises content that conflicts with a set of configuration information; and
  upon determining that the particular access message satisfies the particular condition, performing a responsive action based on the particular condition;
  wherein the set of configuration information identifies a feature to be detected in the particular set of one or more features, and wherein satisfying the particular condition comprises detection of the feature;
  wherein the particular set of one or more features is contained in the particular access message at the access control server;
  receiving a second access message,
  wherein a particular feature, of the particular set of one or more features of the particular access message, corresponds to a particular feature instantiation of the particular feature;
  wherein a second particular feature, of a second particular access message of the one or more access messages, is the same feature as the particular feature and the second particular feature corresponds to the particular feature instantiation of the particular feature; and wherein determining whether the particular access message satisfies the particular condition comprises determining if the difference in time between when the particular access message and the second oarticular access message arrived is less than a predefined threshold.

2. The method of claim 1, wherein performing the responsive action comprises blocking the particular access message.

3. The method of claim 1, wherein performing the responsive action comprises blocking all messages of one or more particular types from a sender of the particular access message for a predetermined amount of time.

4. The method of claim 1, wherein performing the responsive action comprises sending an alert to a sender of the particular access message.

5. The method of claim 1, wherein performing the responsive action comprises sending an alert to a system administrator indicating that the particular condition has been satisfied.

6. The method of claim 1, wherein performing the responsive action comprises writing a record to a machine-readable medium indicating that the particular condition has been satisfied.

7. The method of claim 1, wherein performing the responsive action comprises sending a message to a sender of the particular access message indicating that the sender of the particular access message cannot send subsequent access messages of one or more types for a predefined amount of time.

8. The method of claim 1, wherein performing the responsive action comprises sending a message to a sender of the particular access message indicating that the sender of the particular access message cannot forward messages from a particular originator of the particular access message for a predefined amount of time.

9. The method of claim 1, wherein the particular condition is one of one or more conditions and the method further comprises:
selecting the particular condition from the one or more conditions based on any of: a sender of the particular access message, a device to which the particular access message was sent, the particular set of one or more features, and a duration of time which the sender of the particular access message has been connected to the device to which the particular access message was sent.

10. The method of claim 1, further comprising:
determining whether a sender of a certain access message is trusted;
upon determining that the sender of the certain access message is not trusted, determining a set of features for the certain access message.

11. The method of claim 1, further comprising:
determining whether the particular access message satisfies a second particular condition based on the particular set of one or more features; and
upon determining that the particular access message satisfies the second particular condition, performing a second responsive action based on the second particular condition.

12. The method of claim 1, wherein the particular feature is one of: a supplicant IP address, a supplicant MAC address, a RADIUS Username, a Diameter Username, a TACACS+ Username, and an EAP identity.

13. The method of claim 1,
wherein a first particular feature and a second particular feature are each one of the particular set of one or more features of the particular access message;
wherein a third particular feature and a fourth particular feature are each one of the sets of one or more features of a certain access message of the one or more access messages;
wherein the first particular feature and third particular feature both coffespond to a first certain feature;
wherein the second particular feature and fourth particular feature both correspond to a second certain feature;
and wherein determining whether the particular access message satisfies the particular condition comprises:
determining whether the first particular feature corresponds to a first particular feature instantiation of the first certain feature and the third particular feature corresponds to the same first particular feature instantiation of the first certain feature; and
determining whether the second particular feature corresponds to a second particular feature instantiation of the second certain feature and the fourth particular feature corresponds to a third particular feature instantiation of the second certain feature, wherein the second particular feature instantiation and the third particular feature instantiation are distinct from one another.

14. The method of claim 13, wherein the first certain feature is one of: a supplicant IP address, a supplicant MAC address, a RADIUS Username, a Diameter Username, a TACACS+ Username, and an EAP identity.

15. The method of claim 13, wherein the second certain feature is one of: a supplicant IP address, a supplicant MAC address, a RADIUS Username, a Diameter Username, a TACACS+ Username, and an EAP identity.

16. The method of claim 1, wherein each set of the one or more features comprises one or more of: a supplicant IP address, a supplicant MAC address, a RADIUS Username, Diameter Username, a TACACS+ Username, and an EAP identity.

17. The method of claim 1, wherein the particular set of one or more features of the particular access message comprises one or more of: a supplicant IP address, a supplicant MAC address, a RADIUS Username, a Diameter Username, a TACACS+ Username, and an EAP identity.

18. The method of claim 1, further comprising:
receiving configuration information indicating the particular condition; and
receiving configuration information indicating the responsive action for the particular condition.

19. The method of claim 1, wherein satisfying the particular condition further indicates that the particular access message was received at a time less than a threshold value away from when a previous access message was received, wherein the particular access message and previous access message are of a same type and from a same sender.

20. The method of claim 1, wherein satisfying the particular condition further indicates that the particular access message has a different value for a feature than a previous access message from a same sender.

21. The method of claim 1, wherein satisfying the particular condition further indicates that the particular access message has a same value for a feature as a previous access message from a different sender.

22. A method of controlling access message flow comprising:
determining a particular condition and a particular responsive action based on two or more messages;

configuring a device to detect the particular condition;

configuring the device to perform the particular responsive action upon detection of the particular condition;

receiving one or more access messages at an access control server;

determining one or more sets of features, wherein the one or more sets of features comprise a set of one or more features for each of one or more of the one or more access messages;

receiving a particular access message;

determining a particular set of one or more features of the particular access message;

determining whether the particular access message satisfies the particular condition based on the particular set of one or more features and the one or more sets of features, wherein satisfying the particular condition indicates that the particular access message (a) has a valid format, and (b) comprises content that conflicts with a set of configuration information; and if the particular access message satisfies the particular condition, performing the particular responsive action;

wherein the particular set of one or more features is contained in the particular access message;

receiving a second access message, wherein a particular feature, of the particular set of one or more features of the particular access message, corresponds to a particular feature instantiation of the particular feature;

wherein a second particular feature, of a second particular access message of the one or more access messages, is the same feature as the particular feature and the second particular feature corresponds to the particular feature instantiation of the particular feature; and wherein determining whether the particular access message satisfies the particular condition comprises determining if the difference in time between when the particular access message and the second particular access message arrived is less than a predefined threshold.

23. A system for controlling access message flow comprising:

a supplicant comprising a first network interface configured to communicate with an access control server;

the access control server comprising a second network interface configured to communicate with the supplicant, the access control server further comprising a processor;

a storage device storing one or more sequences of instructions which, when executed by the processor, cause the processor to carry out the steps of:

upon receiving a particular access message at an access control server, determining a particular set of one or more features of the particular access message;

determining whether the particular access message satisfies a particular condition based on the particular set of one or more features, wherein satisfying the particular condition indicates that the particular access message (a) has a valid format, and (b) comprises content that conflicts with a set of configuration information; and if upon determining that the particular access message satisfies the particular condition, performing a responsive action based on the particular condition;

wherein the set of configuration information identifies a feature to be detected in the particular set of one or more features, and wherein satisfying the particular condition comprises detection of the feature;

wherein the particular set of one or more features is contained in the particular access message at the access control server;

receiving a second access message, wherein a particular feature, of the particular set of one or more features of the particular access message, corresponds to a particular feature instantiation of the particular feature;

wherein a second particular feature, of a second particular access message of the one or more access messages, is the same feature as the particular feature and the second particular feature corresponds to the particular feature instantiation of the particular feature; and wherein determining whether the particular access message satisfies the particular condition comprises determining if the difference in time between when the particular access message and the second particular access message arrived is less than a predefined threshold.

24. A system for controlling access message flow comprising:

a supplicant comprising a first network interface configured to communicate with an access control server via a network device;

the access control server configured to communicate with the network device and with the supplicant via the network device, the access control server comprising a second network interface;

the network device comprising a processing means and a third network interface configured to communicate with the supplicant and the access control server, the network device further comprising: a processor;

a storage device storing one or more sequences of instructions which, when executed by the processor, cause the processor to carry out the steps of:

upon receiving a particular access message at an access control server, determining a particular set of one or more features of the particular access message;

determining whether the particular access message satisfies a particular condition based on the particular set of one or more features, wherein satisfying the particular condition indicates that the particular access message (a) has a valid format, and (b) comprises content that conflicts with a set of configuration information; and upon determining that the particular access message satisfies the particular condition, performing a responsive action based on the particular condition;

wherein the set of configuration information identifies a feature to be detected in the particular set of one or more features, and wherein satisfying the particular condition comprises detection of the feature;

wherein the particular set of one or more features is contained in the particular access message at the access control server;

receiving a second access message, wherein a particular feature, of the particular set of one or more features of the particular access message, corresponds to a particular feature instantiation of the particular feature;

wherein a second particular feature, of a second particular access message of the one or more access messages, is the same feature as the particular feature and the second particular feature corresponds to the particular feature instantiation of the particular feature; and wherein determining whether the particular access message satisfies the particular condition comprises determining if the difference in time between when the particular access message and the second particular access message arrived is less than a predefined threshold.

25. An apparatus of controlling access message flow comprising:
   a processor
   means for, upon receiving a particular access message, determining a particular set of one or more features of the particular message;
   means for determining whether the particular access message satisfies a particular condition based on the particular set of one or more features, wherein satisfying the particular condition indicates that the particular access message (a) has a valid format, and (b) comprises content that conflicts with a set of configuration information; and
   means for, upon determining that the particular access message satisfies the particular condition, performing a responsive action based on the particular condition;
   wherein the set of configuration information identifies a feature to be detected in the particular set of one or more features, and wherein satisfying the particular condition comprises detection of the feature;
   wherein the particular set of one or more features is contained in the particular access message at the access control server;
   receiving a second access message,
   wherein a particular feature, of the particular set of one or more features of the particular access message, corresponds to a particular feature instantiation of the particular feature;
   wherein a second particular feature, of a second particular access message of the one or more access messages, is the same feature as the particular feature and the second particular feature corresponds to the particular feature instantiation of the particular feature; and
   wherein determining whether the particular access message satisfies the particular condition comprises determining if the difference in time between when the particular access message and the second particular access message arrived is less than a predefined threshold.

26. The apparatus of claim 25, wherein the means for performing the responsive action comprises means for blocking the particular access message.

27. The apparatus of claim 25, wherein the means for performing the responsive action comprises means for blocking all messages of one or more particular types from a sender of the particular access message for a predetermined amount of time.

28. The apparatus of claim 25, wherein the means for performing the responsive action comprises means for sending an alert to a sender of the particular access message.

29. The apparatus of claim 25, wherein the means for performing the responsive action comprises means for sending an alert to a system administrator indicating that the particular condition has been satisfied.

30. The apparatus of claim 25, wherein the means for performing the responsive action comprises means for writing a record to a machine-readable medium indicating that the particular condition has been satisfied.

31. The apparatus of claim 25, wherein the means for performing the responsive action comprises means for sending a message to a sender of the particular access message indicating that the sender of the particular access message cannot send subsequent access messages of one or more types for a predefined amount of time.

32. The apparatus of claim 25, wherein the means for performing the responsive action comprises means for sending a message to a sender of the particular access message indicating that the sender of the particular access message cannot forward messages from a particular originator of the particular access message for a predefined amount of time.

33. The apparatus of claim 25, wherein the particular condition is one of one or more conditions and the apparatus further comprises:
   means for selecting the particular condition from the one or more conditions based on any of: a sender of the particular access message, a device to which the particular access message was sent, the particular set of one or more features, and a duration of time which the sender of the particular access message has been connected to the device to which the particular access message was sent.

34. The apparatus of claim 25, further comprising:
   means for determining whether the particular access message satisfies a second particular condition based on the particular set of one or more features; and
   means for, if the particular access message satisfies the second particular condition, performing a second responsive action based on the second particular condition.

35. The apparatus of claim 25,
   wherein a first particular feature and a second particular feature are each one of the particular set of one or more features of the particular access message;
   wherein a third particular feature and a fourth particular feature are each one of the sets of one or more features of a certain access message of the one or more access messages;
   wherein the first particular feature and third particular feature both correspond to a first certain feature;
   wherein the second particular feature and fourth particular feature both correspond to a second certain feature;
   and wherein the means for determining whether the particular access message satisfies the particular condition comprises:
   means for determining whether the first particular feature corresponds to a first particular feature instantiation of the first certain feature and the third particular feature corresponds to the same first particular feature instantiation of the first certain feature; and
   means for determining whether the second particular feature corresponds to a second particular feature instantiation of the second certain feature and the fourth particular feature corresponds to a third particular feature instantiation of the second certain feature, wherein the second particular feature instantiation and the third particular feature instantiation are distinct from one another.

36. The apparatus of claim 25, further comprising:
   means for receiving configuration information indicating the particular condition; and
   means for receiving configuration information indicating the responsive action for the particular condition.

37. The apparatus of claim 25, wherein each set of the one or more features comprises one or more of: a supplicant IP address, a supplicant MAC address, a RADIUS Username, a Diameter Username, a TACACS+ Username, and an EAP identity; and wherein the particular set of one or more features of the particular access message comprises one or more of: supplicant IP address, a supplicant MAC address, a RADIUS Username, a Diameter Username, a TACACS+ Username, and an EAP identity.

38. An apparatus for controlling access message flow, comprising:
- a network interface that is coupled to the data network for receiving one or more packet flows therefrom;
- a processor;
- a storage device storing one or more sequences of instructions which, when executed by the processor, cause the processor to carry out the steps of:
- upon receiving a particular access message at an access control server, determining a particular set of one or more features of the particular access message;
- determining whether the particular access message satisfies a particular condition based on the particular set of one or more features, wherein satisfying the particular condition indicates that the particular access message (a) has a valid format, and (b) comprises content that conflicts with a set of configuration information; and
- upon determining that the particular access message satisfies the particular condition, performing a responsive action based on the particular condition;
- wherein the set of configuration information identifies a feature to be detected in the particular set of one or more features, and wherein satisfying the particular condition comprises detection of the feature;
- wherein the particular set of one or more features is contained in the particular access message at the access control server;
- receiving a second access message,
- wherein a particular feature, of the particular set of one or more features of the particular access message, corresponds to a particular feature instantiation of the particular feature;
- wherein a second particular feature, of a second particular access message of the one or more access messages, is the same feature as the particular feature and the second particular feature corresponds to the particular feature instantiation of the particular feature; and
- wherein determining whether the particular access message satisfies the particular condition comprises determining if the difference in time between when the particular access message and the second particular access message arrived is less than a predefined threshold.

39. The apparatus of claim 38, wherein performing the responsive action comprises blocking the particular access message.

40. The apparatus of claim 38, wherein performing the responsive action comprises blocking all messages of one or more particular types from a sender of the particular access message for a predetermined amount of time.

41. The apparatus of claim 38, wherein performing the responsive action comprises sending an alert to a sender of the particular access message.

42. The apparatus of claim 38, wherein performing the responsive action comprises sending an alert to a system administrator indicating that the particular condition has been satisfied.

43. The apparatus of claim 38, wherein performing the responsive action comprises writing a record to a machine-readable medium indicating that the particular condition has been satisfied.

44. The apparatus of claim 38, wherein performing the responsive action comprises sending a message to a sender of the particular access message indicating that the sender of the particular access message cannot send subsequent access messages of one or more types for a predefined amount of time.

45. The apparatus of claim 38, wherein performing the responsive action comprises sending a message to a sender of the particular access message indicating that the sender of the particular access message cannot forward messages from a particular originator of the particular access message for a predefined amount of time.

46. The apparatus of claim 38, wherein the particular condition is one of one or more conditions and the apparatus further comprises:
- selecting the particular condition from the one or more conditions based on any of a sender of: the particular access message, a device to which the particular access message was sent, the particular set of one or more features, and a duration of time which the sender of the particular access message has been connected to the device to which the particular access message was sent.

47. The apparatus of claim 38, wherein the apparatus further comprises one or more stored sequences of instructions which, when executed by the processor, cause the processor to carry out the steps of:
- determining whether the particular access message satisfies a second particular condition based on the particular set of one or more features; and
- if the particular access message satisfies the second particular condition, performing a second responsive action based on the second particular condition.

48. The apparatus of claim 38,
- wherein a first particular feature and a second particular feature are each one of the particular set of one or more features of the particular access message;
- wherein a third particular feature and a fourth particular feature are each one of the sets of one or more features of a certain access message of the one or more access messages;
- wherein the first particular feature and third particular feature both coffespond to a first certain feature;
- wherein the second particular feature and fourth particular feature both correspond to a second certain feature;
- and wherein determining whether the particular access message satisfies the particular condition comprises:
- determining whether the first particular feature corresponds to a first particular feature instantiation of the first certain feature and the third particular feature corresponds to the same first particular feature instantiation of the first certain feature; and
- determining whether the second particular feature corresponds to a second particular feature instantiation of the second certain feature and the fourth particular feature corresponds to a third particular feature instantiation of the second certain feature, wherein the second particular feature instantiation and the third particular feature instantiation are distinct from one another.

49. The apparatus of claim 38, wherein the apparatus further comprises one or more stored sequences of instructions which, when executed by the processor, cause the processor to carry out the steps of:
- receiving configuration information indicating the particular condition; and
- receiving configuration information indicating the responsive action for the particular condition.

50. The apparatus of claim 38, wherein each set of the one or more features comprises one or more of: a supplicant IP address, a supplicant MAC address, a RADIUS Username, a Diameter Username, a TACACS+ Username, and an EAP identity; and wherein the particular set of one or more features of the particular access message comprises one or more of: a supplicant IP address, a supplicant MAC address, a RADIUS Username, a Diameter Username, a TACACS+ Username, and an EAP identity.

51. A storage device storing one or more sequences of instructions for controlling access message flow, which instructions, when executed by one or more processors, cause the one or more processors to carry out the steps of:
 upon receiving a particular access message at an access control server, determining a particular set of one or more features of the particular access message;
 determining whether the particular access message satisfies a particular condition based on the particular set of one or more features, wherein satisfying the particular condition indicates that the particular access message (a) has a valid format, and (b) comprises content that conflicts with a set of configuration information; and
 upon determining that the particular access message satisfies the particular condition, performing a responsive action based on the particular condition;
 wherein the set of configuration information identifies a feature to be detected in the particular set of one or more features, and wherein satisfying the particular condition comprises detection of the feature;
 wherein the particular set of one or more features is contained in the particular access message at the access control server;
 receiving a second access message,
 wherein a particular feature, of the particular set of one or more features of the particular access message, corresponds to a particular feature instantiation of the particular feature;
 wherein a second particular feature, of a second particular access message of the one or more access messages, is the same feature as the particular feature and the second particular feature corresponds to the particular feature instantiation of the particular feature; and
 wherein determining whether the particular access message satisfies the particular condition comprises determining if the difference in time between when the particular access message and the second particular access message arrived is less than a predefined threshold.

52. The storage device of claim 51, wherein performing the responsive action comprises blocking the particular access message.

53. The storage device of claim 51, wherein performing the responsive action comprises blocking all messages of one or more particular types from a sender of the particular access message for a predetermined amount of time.

54. The storage device of claim 51, wherein performing the responsive action comprises sending an alert to a sender of the particular access message.

55. The storage device of claim 51, wherein performing the responsive action comprises sending an alert to a system administrator indicating that the particular condition has been satisfied.

56. The storage device of claim 51, wherein performing the responsive action comprises writing a record to a machine-readable medium indicating that the particular condition has been satisfied.

57. The storage device of claim 51, wherein performing the responsive action comprises sending a message to a sender of the particular access message indicating that the sender of the particular access message cannot send subsequent access messages of one or more types for a predefined amount of time.

58. The storage device of claim 51, wherein performing the responsive action comprises sending a message to a sender of the particular access message indicating that the sender of the particular access message cannot forward messages from a particular originator of the particular access message for a predefined amount of time.

59. The storage device of claim 51, wherein the particular condition is one of one or more conditions and the machine-readable medium further comprising instructions which, when executed by the one or more processors, cause the one or more processors to carry out the step of:
 selecting the particular condition from the one or more conditions based on any of a sender of: the particular access message, a device to which the particular access message was sent, the particular set of one or more features, and a duration of time which the sender of the particular access message has been connected to the device to which the particular access message was sent.

60. The storage device of claim 51, further comprising instructions which, when executed by the one or more processors, cause the one or more processors to carry out the steps of:
 determining whether the particular access message satisfies a second particular condition based on the particular set of one or more features; and
 upon determining that the particular access message satisfies the second particular condition, performing a second responsive action based on the second particular condition.

61. The storage device of claim 51,
 wherein a first particular feature and a second particular feature are each one of the particular set of one or more features of the particular access message;
 wherein a third particular feature and a fourth particular feature are each one of the sets of one or more features of a certain access message of the one or more access messages;
 wherein the first particular feature and third particular feature both correspond to a first certain feature;
 wherein the second particular feature and fourth particular feature both correspond to a second certain feature;
 and wherein determining whether the particular access message satisfies the particular condition comprises:
 determining whether the first particular feature corresponds to a first particular feature instantiation of the first certain feature and the third particular feature corresponds to the same first particular feature instantiation of the first certain feature; and
 determining whether the second particular feature corresponds to a second particular feature instantiation of the second certain feature and the fourth particular feature corresponds to a third particular feature instantiation of the second certain feature, wherein the second particular feature instantiation and the third particular feature instantiation are distinct from one another.

62. The storage device of claim 51, further comprising instructions which, when executed by the one or more processors, cause the one or more processors to carry out the steps of:
 receiving configuration information indicating the particular condition; and
 receiving configuration information indicating the responsive action for the particular condition.

63. The storage device of claim 51, wherein each set of the one or more features comprises one or more of: a supplicant IP address, a supplicant MAC address, a RADIUS Username, a Diameter Username, a TACACS+ Username, and an EAP identity; and wherein the particular set of one or more features of the particular access message comprises one or more of: a supplicant IP address, a supplicant MAC address, a RADIUS Username, a Diameter Username, a TACACS+ Username, and an EAP identity.

* * * * *